US008913468B1

(12) United States Patent  
Peng

(10) Patent No.: US 8,913,468 B1
(45) Date of Patent: Dec. 16, 2014

(54) RESONATOR ENHANCED NEAR FIELD TRANSDUCER

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/951,085

(22) Filed: Jul. 25, 2013

(51) Int. Cl.
G11B 11/00 (2006.01)

(52) U.S. Cl.
USPC ........................................ 369/13.33

(58) Field of Classification Search
None
See application file for complete search history.

(56) References Cited

U.S. PATENT DOCUMENTS

| 2012/0281957 A1 | 11/2012 | Chamanzar et al. |
| 2013/0330573 A1* | 12/2013 | Zhao et al. ..................... 428/814 |
| 2014/0050486 A1* | 2/2014 | Bain et al. ..................... 398/118 |

* cited by examiner

Primary Examiner — Paul Huber
(74) Attorney, Agent, or Firm — Hollingsworth Davis, LLC

(57) ABSTRACT

An apparatus includes a near field transduce (NFT), a waveguide core, and a dielectric resonator. The waveguide core is configured to propagate electromagnetic radiation. The dielectric resonator is disposed between the waveguide core and the NFT and is configured to transfer energy of the electromagnetic radiation to the NFT.

18 Claims, 9 Drawing Sheets

RESONATOR ENHANCED NEAR FIELD TRANSDUCER

SUMMARY

Various embodiments described in this disclosure are generally directed to a dielectric resonator inserted between a light delivery waveguide core and a near-field transducer (NFT).

Some embodiments involve an apparatus that comprises an NFT, a waveguide core, and a dielectric resonator. The waveguide core is configured to propagate electromagnetic radiation. The dielectric resonator is disposed between the waveguide core and the NFT and is configured to transfer energy of the electromagnetic radiation to the NFT.

Some embodiments involve an apparatus that includes a magnetic write pole, a heat sink, an NFT, a waveguide, and a dielectric resonator. The magnetic recording pole is of conventional design. The heat sink is wrapped at least partially around the magnetic write pole. The NFT is proximate the magnetic write pole. The waveguide core is suitable for propagation of electromagnetic radiation. The dielectric resonator is disposed between the waveguide core and the NFT and is configured to transfer energy of the electromagnetic radiation from the waveguide core to the NFT.

Some embodiments involve a method of operating an NFT subassembly. Electromagnetic radiation propagates in a waveguide core. Energy from the electromagnetic radiation is transferred to an NFT through a dielectric resonator disposed between the waveguide core and the NFT. The electromagnetic radiation is converted to surface plasmons in the NFT.

DETAILED DESCRIPTION

Figure 1A:
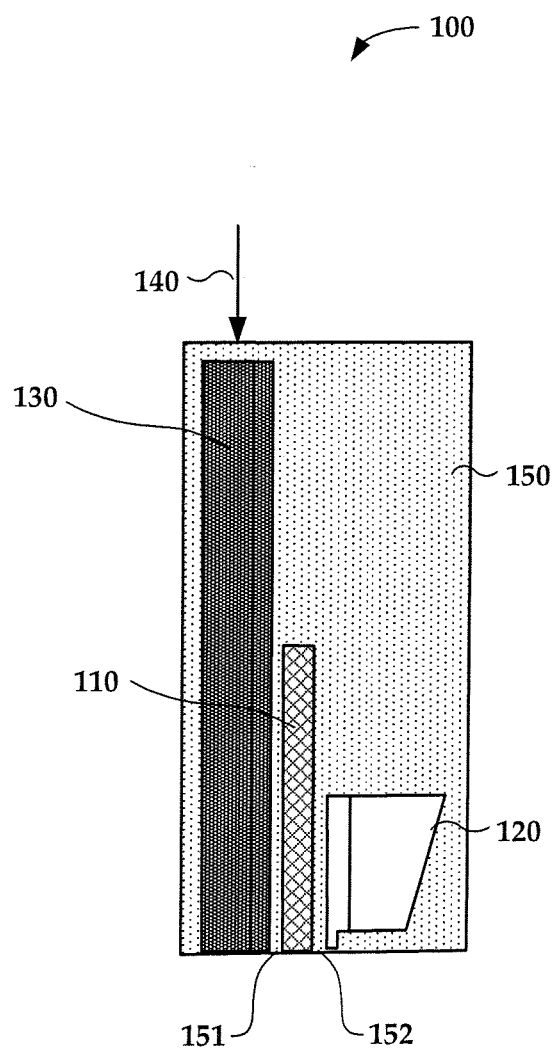
FIG. 1A is a cross-sectional side view of a of a resonator-enhanced NFT subassembly in accordance with some embodiments.

As the magnetic grain size is reduced to increase the storage density in magnetic storage media, the grains become superparamagnetic, causing their magnetic state to become thermally unstable and the magnetized grains to gradually lose a particular magnetic state over time. Materials with a large magnetic anisotropy can support smaller grains and larger storage densities. However, the coercivity of high-anisotropy materials is greater than the magnetic field that can be generated by a recording head.

Heat assisted magnetic recording (HAMR) and the like addresses this problem by localized heating of the storage medium above its Curie point to reduce its coercivity while data is being stored in the medium. Optical energy must be efficiently delivered and confined to a spot in the medium that is much smaller than the diffraction limit of light so that neighboring tracks are not heated. Heating and cooling of the medium may occur within about 1 nanosecond (ns) or less in order to achieve the specified data rates, to generate a large thermal gradient for sharp bit edge definition, and to ensure that the recorded data are thermally stable during cooling to ambient. Heating the media at the precise point that the data is stored temporarily reduces the magnetic anisotropy of the media. After cooling, the magnetic anisotropy returns to the relatively high value to stabilize the stored magnetic state.

The tiny and confined optical spot needed for HAMR can be achieved by surface plasmons generated by a near field transducer (NFT) excited by electromagnetic radiation emitted by a light source. Surface plasmons (SPs) are collective oscillations of surface charge that are confined to an interface between a dielectric and a metal. When SPs are resonantly excited by the external optical field, the electric field amplitude in the vicinity of the surface may be orders of magnitude greater than that of the incident field. Moreover, the region of enhanced field may be tightly confined to a spot much smaller than the incident wavelength of the electromagnetic radiation.

In some configurations an NFT may comprise an enlarged portion (e.g., disc or rectangular shape) and a peg made of a plasmonic metal such as gold (Au), copper (Cu), and silver (Ag). Optical energy, e.g., in the visible to infrared frequencies, is directed to the NFT through a waveguide core and excites resonant collective oscillations in the plasmonic metal near the interface between the plasmonic metal, and a dielectric material such as $Al_2O_3$, $SiO_2$, $Ta_2O_5$, or $SiN_x$.

In some embodiments of a HAMR assembly, the NFT is disposed between the waveguide core and the magnetic write pole. The NFT and magnetic write pole are activated in synchrony to heat the magnetic medium while data is being magnetically stored therein. A heat sink is at least partially wrapped around the pole. The evanescent field that tails from the waveguide core may result in light absorption in the heat sink and pole. The light absorption reduces the heat removal from the NFT and potentially causes degraded coupling efficiency between the NFT and the medium, pole protrusion of the head-media interface, and/or corrosion of the head components.

Embodiments described herein include a dielectric resonator configured to locally excite the NFT. In embodiments wherein the dielectric resonator is disposed between the NFT and waveguide, for example, the distance between the waveguide core and the write pole and heat sink is increased in comparison to configurations that do not include a dielectric resonator. The increased distance between the waveguide core and the write pole and heat sink reduces light absorption in the pole and heat sink, which can lead to enhanced reliability of the HAMR head.

Dielectric resonators are optical components that resonate at a range of frequencies. The resonant frequency of the dielectric resonator is determined by the overall physical dimensions of the resonator and the dielectric constant of the material. The electric and magnetic fields are not zero outside of the resonator but decay from their maximum values rapidly when they are away from the resonator walls. An NFT positioned sufficiently close to the dielectric resonator is excited by the electric field produced at the resonance of the dielectric resonator.

FIG. 1A is a cross sectional side view of a resonator-enhanced NFT subassembly 100 according to some implementations. The subassembly 100 includes a dielectric resonator 110 disposed between an NFT 120 and a waveguide core 130 embedded in a dielectric material 150 such as $Al_2O_3$. The waveguide core 130 may be made of a dielectric such as $Ta_2O_5$ and is configured to propagate electromagnetic radiation 140 from a light source (not shown in FIG. 1A) towards the NFT 120. For example, the waveguide core may have an index of refraction n=in a range of 1.8 to 3.6, and a thickness in the Z direction in a range of 0.05 to $0.4\lambda$. Suitable materials for the waveguide core include $Ta_2O_5$, $Y_2O_3$, $TiO_x$, $SiON_x$, $Hf_2O_3$, SiNx, and/or ZnS.

The dielectric resonator 110 disposed between the waveguide core 130 and the NFT 120 is configured to transfer energy from the electromagnetic radiation to the NFT 120. Suitable materials for the dielectric resonator include $TiO_x$, diamond, CuO, and Si, for example, and having an index of refraction greater than that of the waveguide core. The dielectric resonator 110 may have a lateral size or footprint proximate to surface of the waveguide core 130 of about $(\lambda/2\,n)^2$, where $\lambda$ is the wavelength of the electromagnetic radiation in the waveguide core in a vacuum and n is the index of refraction of the dielectric resonator 110. The shape of the footprint of the dielectric resonator 110 proximate to the waveguide core 130 may be rectangular, semicircular, or circular or other shape with a substantially constant thickness perpendicular to the waveguide core surface.

The NFT may comprise an enlarged transducer portion and peg, e.g., a lollipop NFT. The enlarged portion may be rectangular, square, or disk-shaped. The NFT may be made of any plasmonic material.

The dielectric resonator 110 may be separated from the waveguide core 130 and/or the NFT 120 by thin dielectric layers 151, 152, e.g., having a thickness of about 5-30 nm. In many cases, the index of refraction of the dielectric resonator 110 is greater than the index of refraction of the waveguide core 130. In various implementations, the dielectric resonator could be single layer with a single index of refraction or multilayered to form a gradient index profile with the material of the highest index of refraction nearest the NFT. The dielectric resonator causes the electromagnetic radiation field from the waveguide core to be pulled into the dielectric resonator and to locally excite the NFT. For example, the index of refraction of the dielectric resonator may increase by about 0.3 over the thickness of the resonator.

Figure 1A:
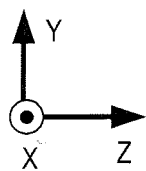
Figure 1B:
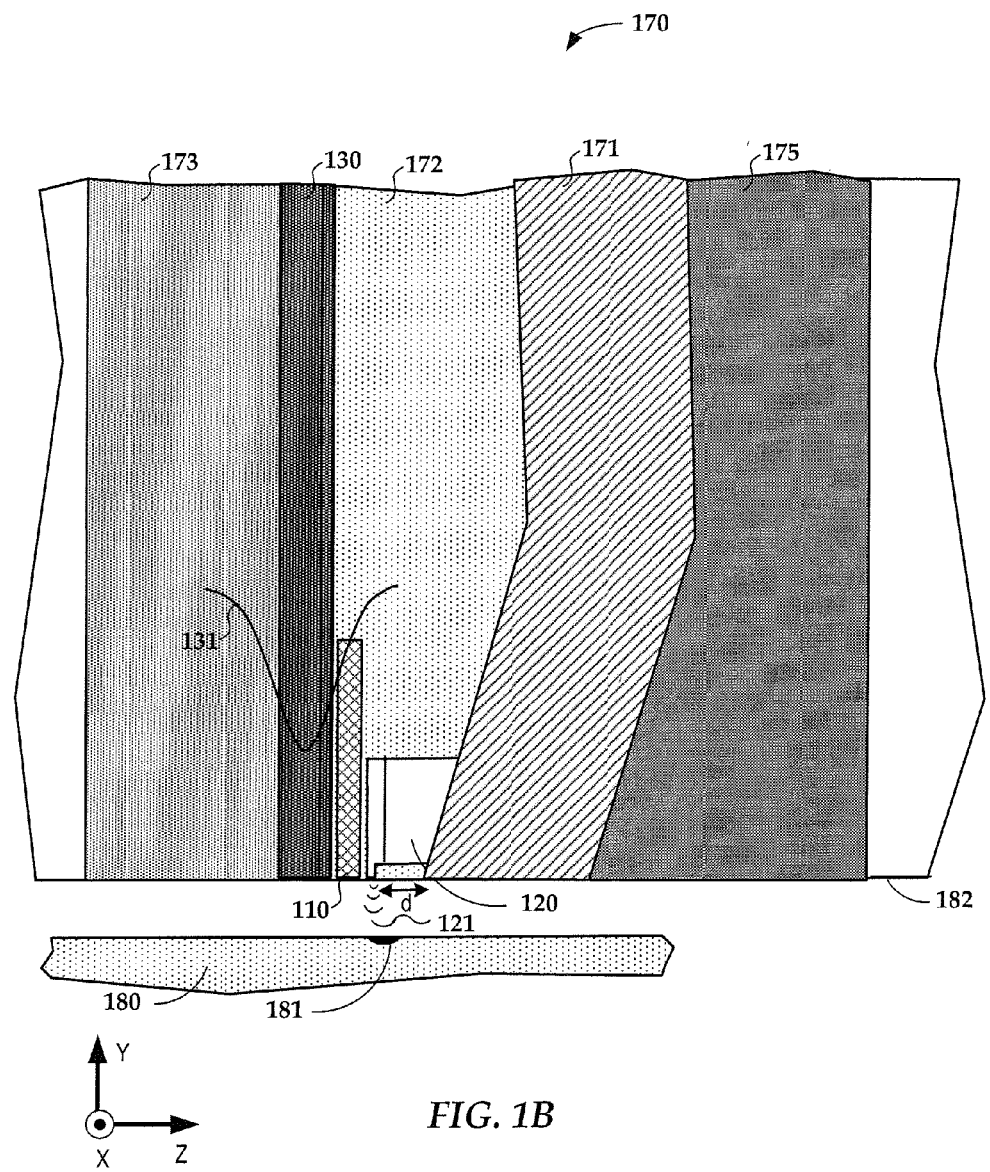
FIG. 1B depicts a cross-sectional side view of a heat assisted magnetic recording (HAMR) assembly that includes the resonator-enhanced NFT subassembly shown in FIG. 1A.

FIG. 1B illustrates the subassembly 100 disposed in a HAMR assembly 170. FIG. 1B provides a view in the yz-plane of the subassembly 100 magnetic pole 171 and a portion of the pole heat sink 175. Various layers of the HAMR assembly 170 are shown in relation to a recording media 180. As previously discussed and shown in FIG. 1A, subassembly 100 includes a waveguide core 130, dielectric resonator 110 and NFT 120. Cladding layers 172, 173 are disposed on either side of the waveguide core 130. A magnetic pole 171 is seen in FIG. 1B proximate to a side of the NFT 120 opposite the dielectric resonator 110. As shown in FIG. 1B, the magnetic pole 171 can be in contact with a side of the NFT 120 for heat sinking. This arrangement allows for heat removal by the magnetic pole 171 through the NFT 120. The magnetic recording medium 180 rotates with respect to the head-media interface (HMI) 182 of the HAMR assembly 170.

In use, light passes through waveguide core 130, producing an electromagnetic field 131 that exists outside the waveguide core 130. The electromagnetic field 131 causes the dielectric resonator 110 to resonate, and to transfer energy from the electromagnetic field 131 into the NFT 120. The electromagnetic energy from the resonator 110 excites the NFT 120 to create surface plasmons that generate a high electric field 121. The electric field 121 is transferred to the medium 180, creating a tiny hot spot 181. The distance, d, between the core and the NFT at the HMI 182 may be about 20-50 nm.

In configurations that do not include a dielectric resonator, the NFT, magnetic pole, and pole heat sink are closer to the waveguide core. The proximity between these components (NFT, magnetic pole and pole heat sink) to the core increases the amount of electromagnetic energy that is transferred to the components in comparison to configurations that include the dielectric resonator. The increased transfer of electromagnetic energy causes heating in the NFT, magnetic pole and heat sink, which can degrade the reliability of the components and/or can reduce coupling efficiency between the NFT and medium.

Figure 2A:
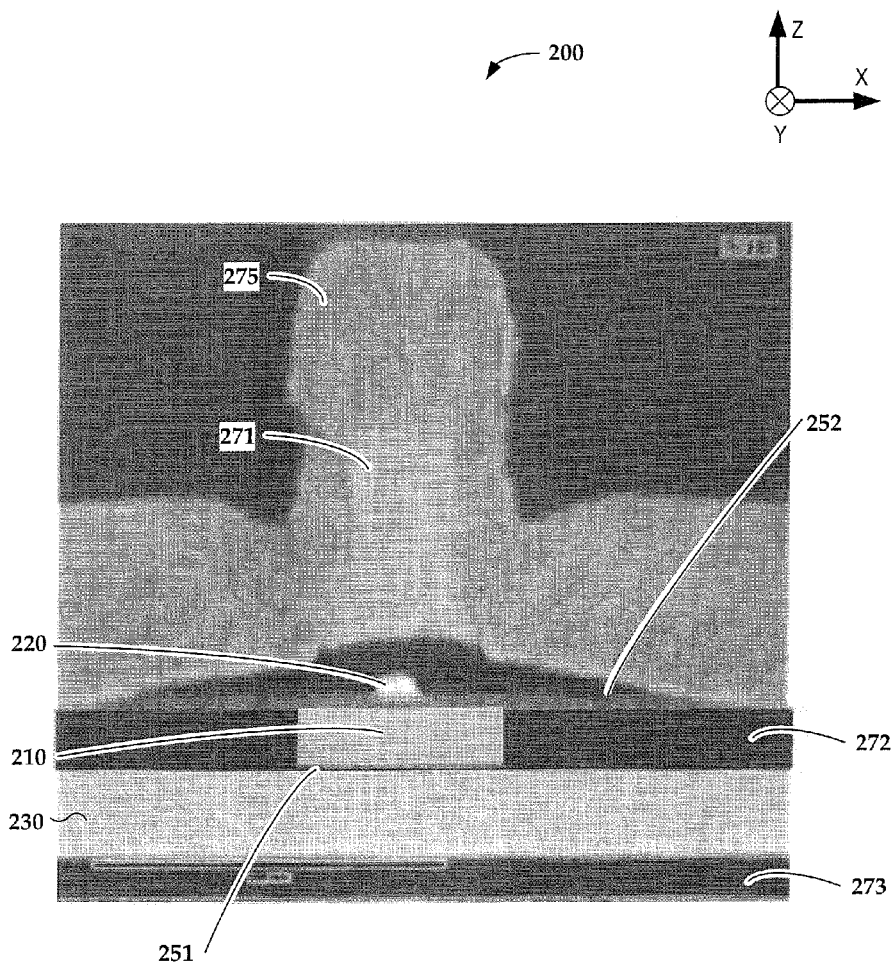
FIG. 2A is a photograph showing a view of a HAMR head looking up from the head-media interface, the HAMR head including a dielectric resonator disposed between the NFT and the waveguide core.
Figure 2B:
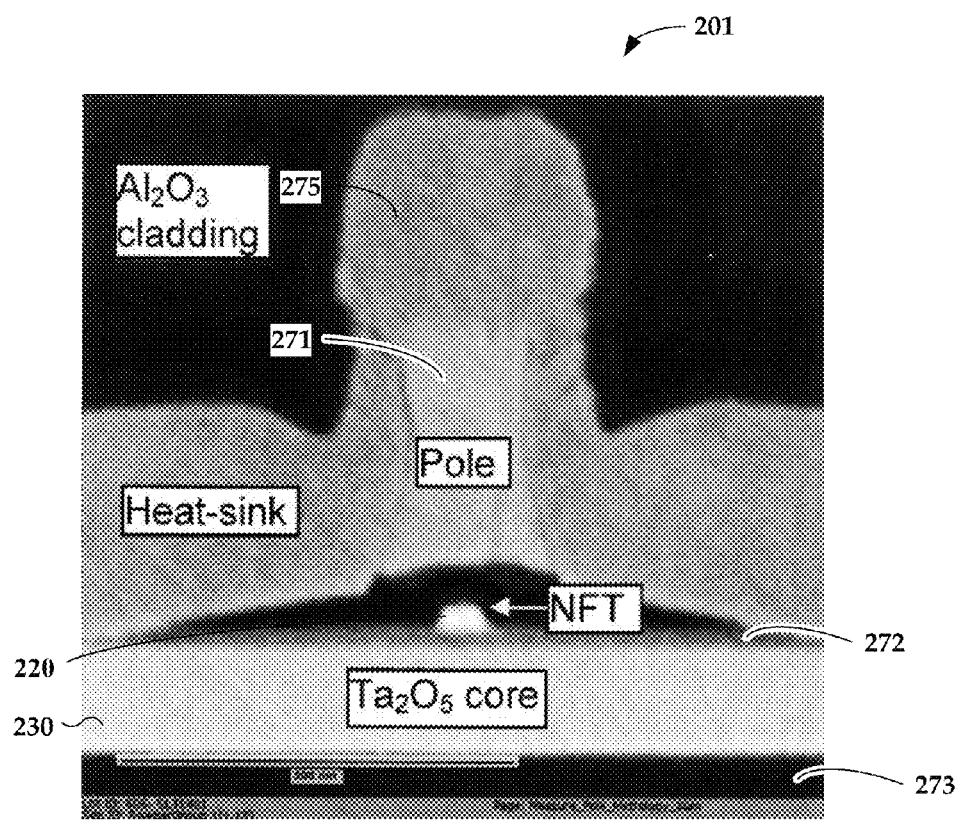
FIG. 2B is a comparative photograph to FIG. 2A showing a HAMR head without a dielectric resonator.

FIG. 2A is a photograph showing a planar view in the xz-plane of an embodiment of a HAMR assembly 200 that includes a dielectric resonator from the point of view looking upward from the head-media interface. FIG. 2B is a comparison photograph of a HAMR assembly 201 that does not include a dielectric resonator.

Magnetic pole 271 is surrounded on three sides by a heat sink 275 that wraps partially around the pole 271 on the side of the magnetic pole opposite the NFT 220. A dielectric resonator 210 (not present in FIG. 2B) is disposed between the NFT 220 and the waveguide core 230. Cladding layers 272, 273 are arranged on either side of the waveguide core 230. Thin dielectric layers 251 and 252 may separate the waveguide core 230 from the dielectric resonator 210 and/or the dielectric resonator 210 from the NFT 220. Waveguide core 230 is spaced apart from the NFT 220 by a dimension that is at least the thickness of the resonator 210. In various embodiments the dielectric resonator may separate the NFT and the waveguide core by an amount greater than or equal to the thickness of the dielectric resonator.

Figure 3:
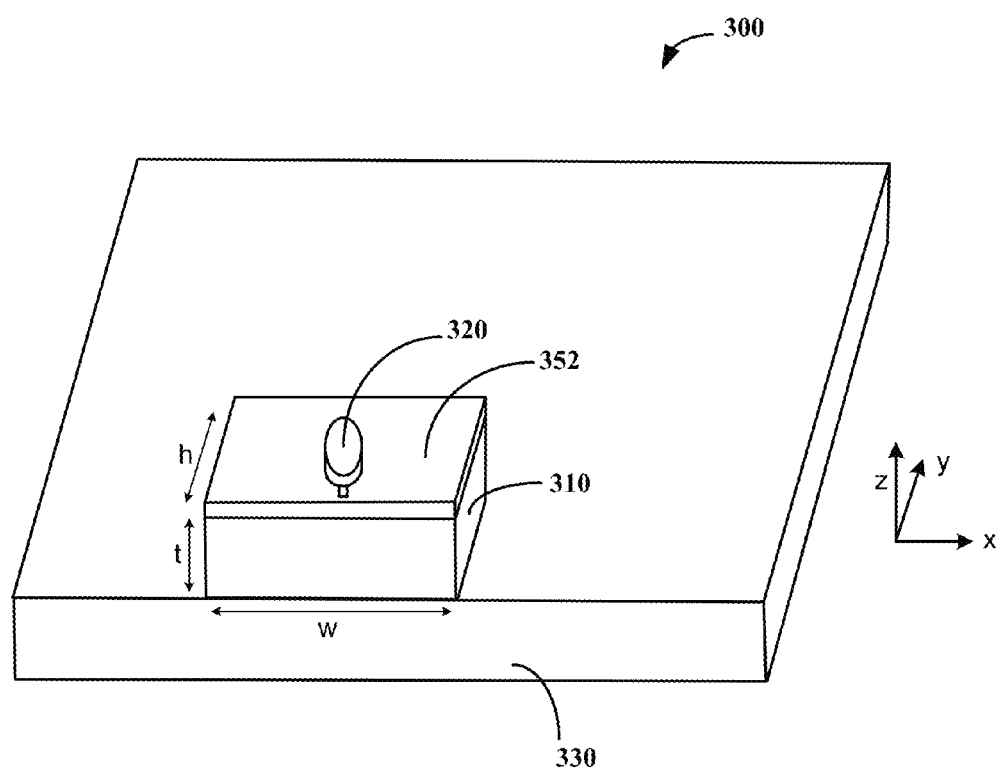
FIG. 3 is a perspective view of an embodiment of the resonator-enhanced NFT subassembly showing a rectangular dielectric resonator.
Figure 4:
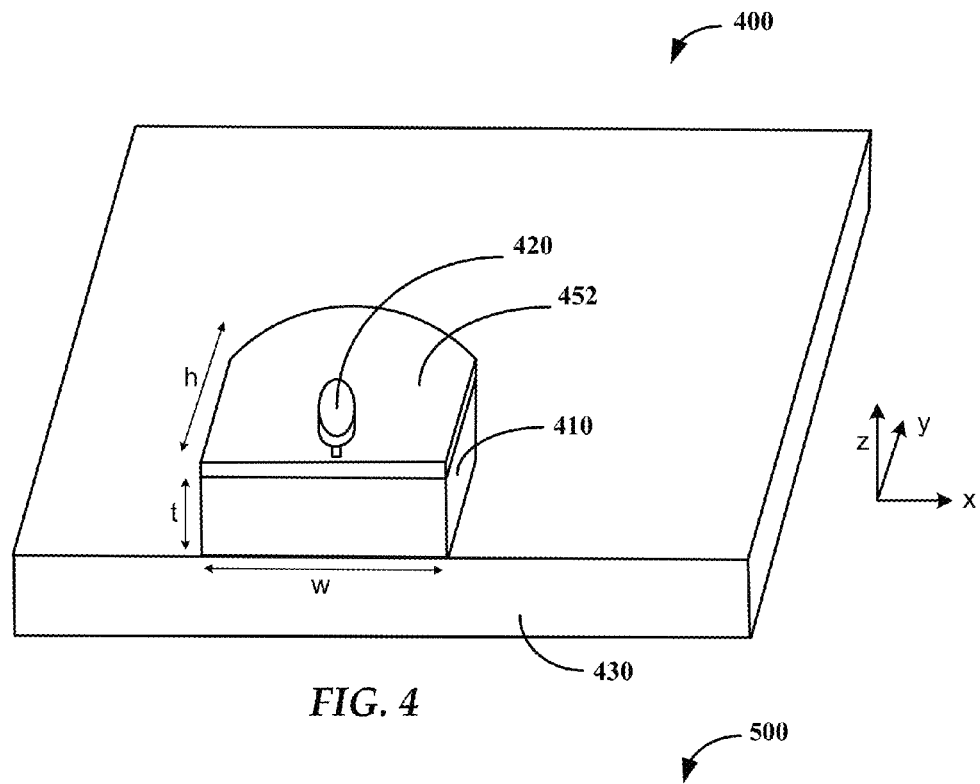
FIG. 4 is a perspective view of an embodiment of the resonator-enhanced NFT subassembly showing a semi-cylindrical dielectric resonator.
Figure 5:
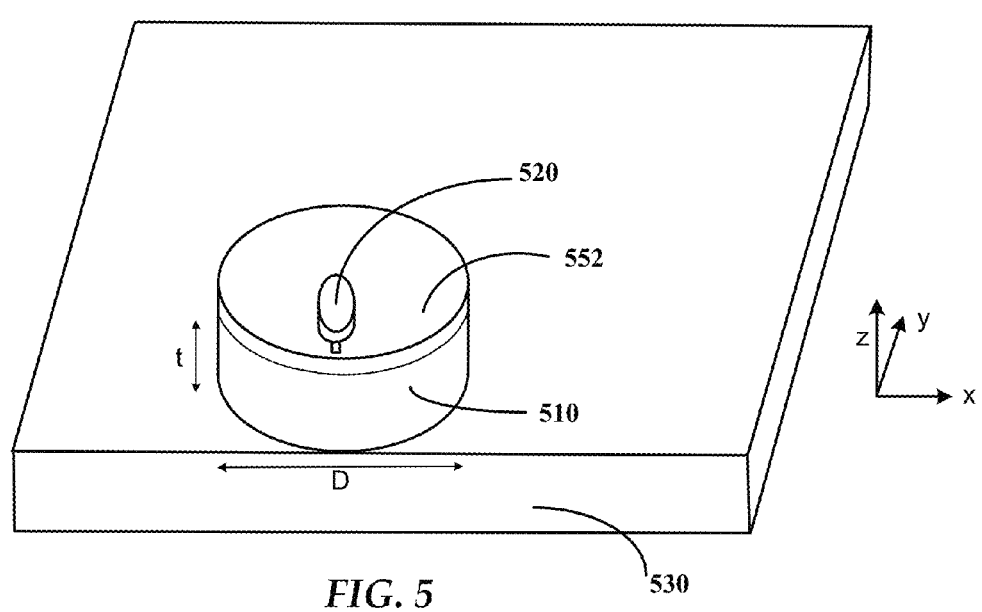
FIG. 5 is a perspective view of an embodiment of the resonator-enhanced NFT subassembly showing a cylindrical dielectric resonator.

FIGS. 3-5 are perspective views of a portion of HAMR assemblies 300, 400, 500 that includes dielectric resonators 310, 410, 510 in accordance with various embodiments. Dielectric resonators in various embodiments have dimensions that can vary, such as a thickness along the z direction, a width along the x direction, and a height, along the y direction. The dielectric resonators may have various shapes in the xy plane. As shown in FIGS. 3-5, the height, h, or diameter, D, of the dielectric resonator 310, 410, 510 may substantially extend beyond the NFT 320, 420, 520 in the y direction. The width, w, or diameter, D, of the dielectric resonator 310, 410, 510 may substantially extend beyond the NFT 320, 420, 520 in the x direction. The partial views of HAMR assemblies 300, 400, 500 shown in FIGS. 3-5 include the waveguide core 330, 430, 530, and a thin cladding layer 352, 452, 552 disposed between the dielectric resonator 310, 410, 510 and the NFT 320, 420, 520. FIG. 3 shows a rectangular dielectric resonator 310 which may have height, h, of about 0.5 to about $2\lambda$, width, w, of about 0.5 to about $2\lambda$, and thickness, t, of about 0.01 to about $0.2\lambda$. The lateral size (h×w) is about $(\lambda/2 n)^2$, where $\lambda$ is the wavelength of the electromagnetic radiation in the waveguide core in a vacuum and n is the index of refraction of the dielectric resonator. FIG. 4 shows an arced resonator 410, having width and thickness, similar to the width and thickness of resonator 310 and a maximum height about equal to the height of resonator 310. FIG. 5 depicts a disk-shaped resonator 520 having thickness similar to the thickness of resonator 310 and diameter, D, equal to about 0.5 to $2\lambda$.

Some embodiments involve a method of operating an NFT subassembly. The method involves propagating electromagnetic radiation in a waveguide core. Energy from the electromagnetic radiation is transferred to an NFT through a dielectric resonator disposed between the waveguide core and the NFT. The electromagnetic radiation is converted to surface plasmons in the NFT.

Figure 6:
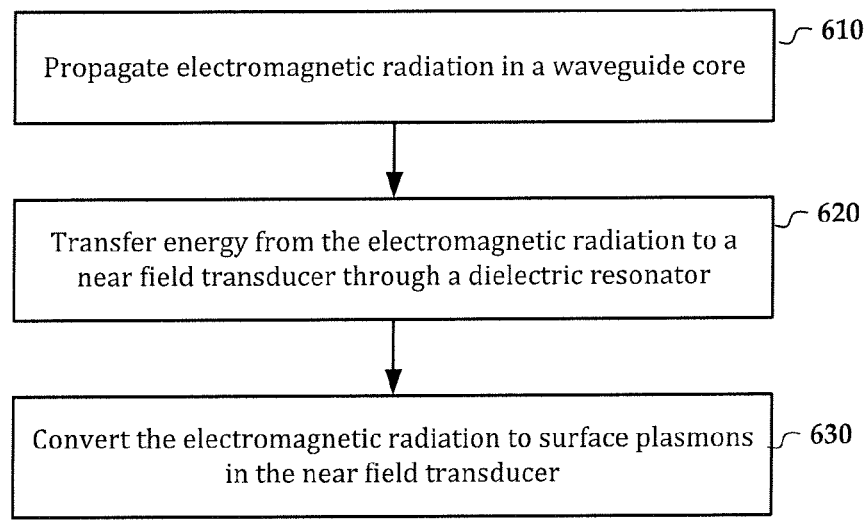
FIG. 6 is a flow diagram a process of operating a resonator-enhanced NFT subassembly in accordance with some embodiments.

FIG. 6 is a flow diagram of a process of operating an NFT subassembly in accordance with some embodiments. The process includes propagating 610 electromagnetic radiation in a waveguide core. The electromagnetic radiation is often the output of a laser diode but other light sources are also possible. The radiation may have wavelength in a range of about 0.65 to about 1.55 µm. The electromagnetic energy is transferred 620 to an NFT through a dielectric resonator. The transfer of the energy from the electromagnetic radiation to the near field transducer involves creating a resonant electric field in the dielectric resonator that locally excites the near field transducer. The energy from the electromagnetic radiation is converted 630 to surface plasmons in the NFT. The electric field created by the plasmonic resonance may heat a small spot on a rotating magnetic medium, the hot spot heating occurring in synchrony with activation of a magnetic write pole that writes magnetic data to the medium.

Subassemblies with dielectric resonators similar in shape to those illustrated in FIG. 1 were simulated. Simulations contained a rectangular dielectric resonator of either $TiO_2$ or diamond between a light delivery waveguide core that was made of $Ta_2O_5$ and an NFT made of Au. The subassemblies included a top waveguide cladding $Al_2O_3$ layer between the dielectric resonator and the NFT. The waveguide core layer had a thickness of 120 nm and an index of refraction (n) equal to 2.08. The top waveguide cladding had a thickness of 20 nm and an n=1.65. The thickness along the z-direction of the dielectric resonator was fixed at 50 nm, and its width along the x-direction and its height along the y-direction were varied. The NFT was a patch antenna design composed of a rectangular body with a height in the y-direction of 190 nm and a width in the x-direction of 200 nm and a peg attached it with a thickness in the z-direction of 30 nm, a width in the x-direction of 40 nm, and a height in the y-direction of 20 nm. The media included a FePt layer that was 12.6 nm thick with a complex refractive index n=2.55+j 2.72, a MgO layer that was 10 nm thick with an n=1.70, and a heat-sink Cu layer that was 60 nm thick with a complex refractive index n=0.26+j 5.29 on a glass substrate. The optical/magnetic head to media spacing was 8 nm with an effective refractive index n=1.21. The dimension of the NFT was optimized for NFT efficiency for recording of the FePt layer. The magnetic pole was slanted and fanned out into the magnetic head. The spacing between the magnetic pole and the NFT at the ABS was 20 nm. The magnetic pole was wrapped with a Cr heat sink such that the total width of the magnetic pole plus Cr heat sink was 500 nm. The heat sink was truncated at the far end of the NFT.

Figure 7:
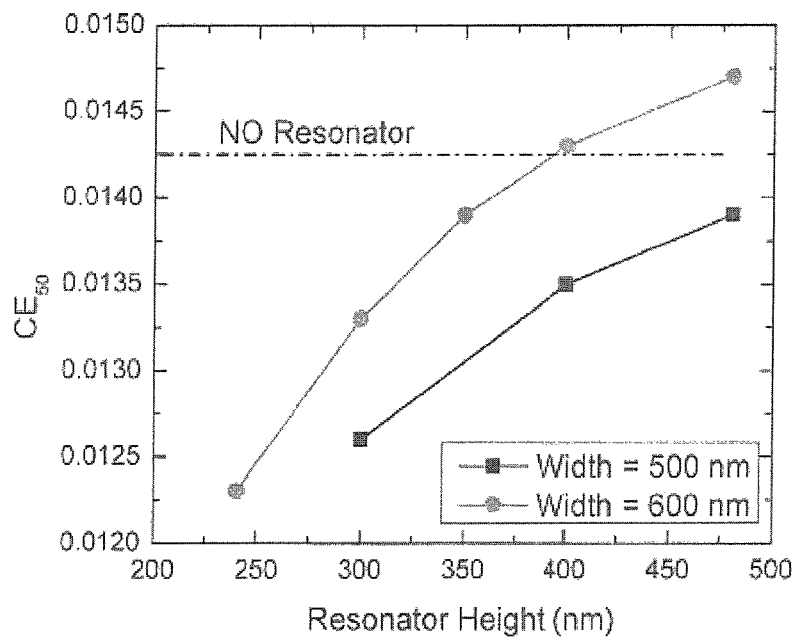
FIG. 7 is a graph of the NFT efficiency of a resonator-enhanced NFT subassembly similar in some respects to the structure shown in FIG. 3 as a function of dielectric resonator width and height.
Figure 8:
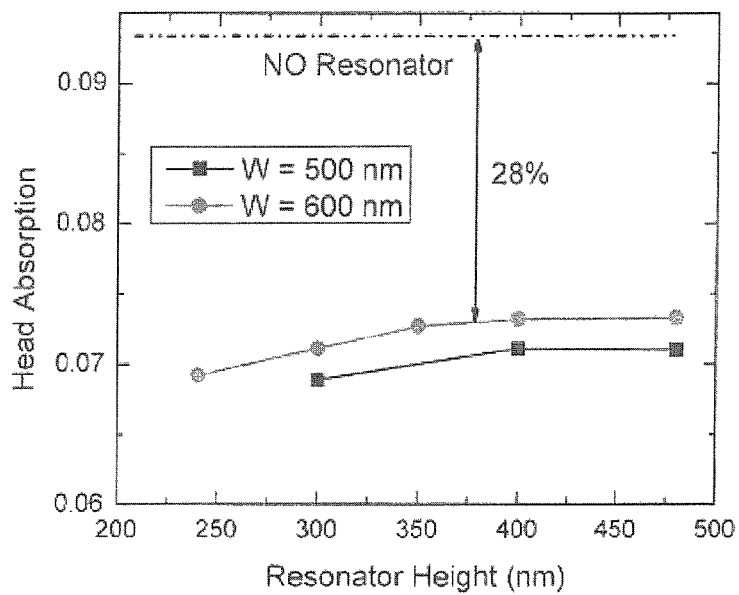
FIG. 8 is a graph of the NFT electromagnetic radiation absorption of the NFT, magnetic pole, and heat sink as a function of dielectric resonator width and height.
Figure 9:
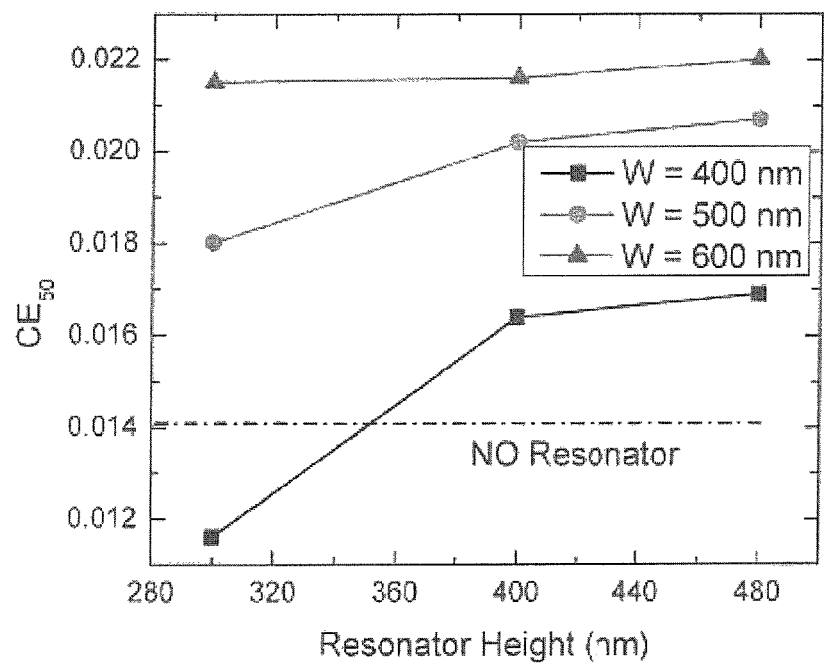
FIG. 9 is a graph of the NFT efficiency of a resonator-enhanced NFT subassembly similar in some respects to the structure shown in FIG. 3 as a function of dielectric resonator width and height.
Figure 10:
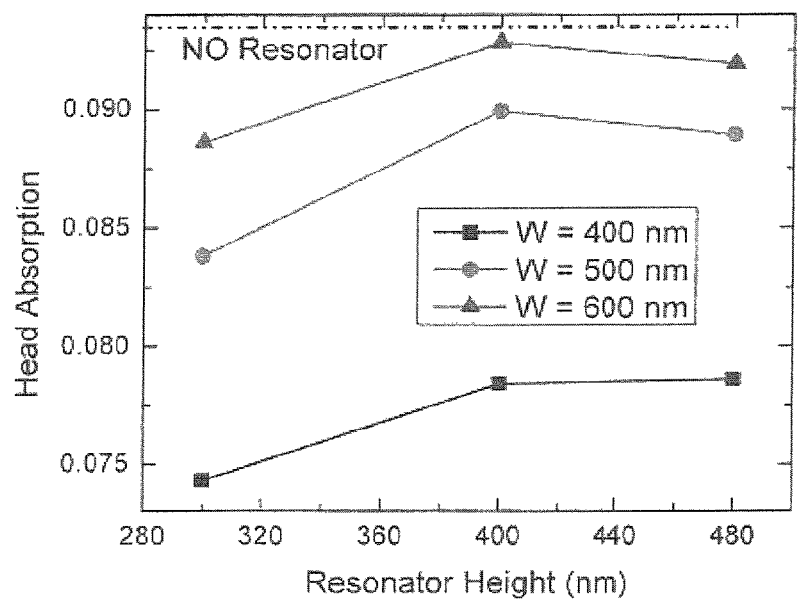
FIG. 10 is a graph of the NFT electromagnetic radiation absorption of the NFT, magnetic pole, and heat sink as a function of dielectric resonator width and height.

Two experiments were modeled using the above setup and the results are shown in the graphs of FIGS. 7 and 8 for the first experiment and FIGS. 9 and 10 for the second experiment. In the first experiment, NFT efficiency, $CE_{50}$, and electromagnetic radiation absorption in the NFT, magnetic pole, and heat sink were determined as a function of dielectric resonator height for a dielectric resonator width of 500 nm and 600 nm. The dielectric resonator had a first refractive index n=2.30, a lower boundary value for $TiO_2$. The results were compared to the $CE_{50}$ for the same system having no dielectric resonator. FIG. 7 is a graph of the NFT efficiency as a function of the dielectric resonator height for the two widths and n=2.30. $CE_{50}$ is the electromagnetic radiation absorption in the FePt layer in a 50 nm by 50 nm square. It is seen that at a dielectric resonator width of 600 nm and height of 370 nm the NFT efficiency, $CE_{50}$, was the same as that without the presence of a dielectric resonator. FIG. 8 is a graph of the NFT electromagnetic radiation absorption of the NFT, magnetic pole, and heat sink as a function of dielectric resonator width and height with n=2.30. At the dielectric resonator dimensions of a 600 nm width and a 370 nm height, the electromagnetic radiation absorption in the head was 28% lower than a head without a dielectric resonator.

In the second experiment, NFT efficiency, $CE_{50}$, and electromagnetic radiation absorption in the NFT, magnetic pole, and heat sink were determined as a function of dielectric resonator height for a dielectric resonator width of 400 nm, 500 nm, and 600 nm. The dielectric resonator had a second refractive index n=2.78, the value for rutile. The results were compared to the $CE_{50}$ for the same system having no dielectric resonator. FIG. 9 is a graph of the NFT efficiency as a function of the dielectric resonator height for the three widths and n=2.78. $CE_{50}$ is the light absorption in the FePt layer in a 50 nm by 50 nm square. FIG. 10 is a graph of the NFT electromagnetic radiation absorption of the NFT, magnetic pole, and heat sink as a function of dielectric resonator width and height with n=2.78. As expected, the NFT efficiency with a dielectric resonator of a higher refractive index was much greater and the electromagnetic radiation absorption was even less than that seen in FIGS. 7 and 8. With the higher index dielectric resonator, the dimensions of the dielectric resonator can be smaller. Alternatively, with the same dielectric resonator dimensions that yielded a 28% reduction in electromagnetic radiation absorption in FIGS. 7 and 8, the NFT efficiency is 53% improved with the higher refractive index material of diamond.

In summary, compact dielectric resonators may be used to enhance HAMR head reliability by moving the NFT and write pole away from the waveguide core reducing the electromagnetic radiation evanescent tail from being absorbed by the NFT, magnetic pole, and heat sink.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments have been presented for the purposes of illustration and description. It is not intended to be exhaustive or to limit the concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not by the detailed description.

What is claimed is:

1. An apparatus, comprising:
a near field transducer;
a waveguide core configured to propagate electromagnetic radiation; and
a dielectric resonator disposed between the waveguide core and the near field transducer, the dielectric resonator configured to transfer energy of the electromagnetic radiation to the near field transducer,
wherein an index of refraction of the dielectric resonator varies with distance from the near field transducer.

2. The apparatus of claim 1, further comprising a magnetic write pole, wherein the near field transducer is disposed between the magnetic write pole and the dielectric resonator.

3. The apparatus of claim 2, further comprising a heat sink wrapped partially around the write pole.

4. The apparatus of claim 1, wherein:
the electromagnetic radiation has a wavelength, $\lambda$;
the dielectric resonator has a refractive index, n; and
a lateral size of the dielectric resonator is equal to or greater than about $(\lambda/2\ n)^2$.

5. The apparatus of claim 1, wherein the dielectric resonator has a rectangular shape.

6. The apparatus of claim 1, wherein the dielectric resonator has a cylindrical shape.

7. The apparatus of claim 1, wherein the dielectric resonator has a semi-cylindrical shape.

8. The apparatus of claim 1, wherein the dielectric resonator has an index of refraction greater than an index of refraction of the waveguide core.

9. The apparatus of claim 1, wherein the dielectric resonator comprises $TiO_x$, diamond or Si.

10. The apparatus of claim 1, wherein the dielectric resonator is separated from the near field transducer by a dielectric layer.

11. The apparatus of claim 1, wherein the dielectric resonator has a thickness of between about 0.01 to about $0.2\lambda$, where $\lambda$ is the wavelength of the electromagnetic radiation.

12. The apparatus of claim 1, wherein the highest index of refraction of the dielectric resonator is proximate the near field transducer.

13. An apparatus, comprising:
a magnetic write pole;
a heat sink at least wrapped partially around the magnetic write pole;
a near field transducer proximate the magnetic write pole;
a waveguide core suitable for propagation of electromagnetic radiation; and
a dielectric resonator disposed between the waveguide core and the near field transducer, the dielectric resonator configured to transfer energy of the electromagnetic radiation from the waveguide core to the near field transducer,
wherein an index of refraction of the dielectric resonator varies with distance from the near field transducer.

14. The apparatus of claim 13, wherein:
the electromagnetic radiation has a wavelength, $\lambda$;
the dielectric resonator has a refractive index, n; and
a lateral size of the dielectric resonator is equal to or greater than about $(\lambda/2\ n)^2$.

15. The apparatus of claim 1, wherein:
the dielectric resonator has a rectangular shape, a cylindrical shape or a semi-cylindrical shape; and
the near field transducer comprises an enlarged transducer portion and a peg, and the enlarged transducer portion is disc shaped or rectangular shaped.

16. The apparatus of claim 13, wherein the dielectric resonator has an index of refraction greater than an index of refraction of the waveguide core.

17. A method, comprising:
propagating electromagnetic radiation in a waveguide core;
transferring energy from the electromagnetic radiation to a near field transducer through a dielectric resonator disposed between the waveguide core and the near field transducer; and
converting the electromagnetic radiation to surface plasmons in the near field transducer,
wherein an index of refraction of the dielectric resonator varies with distance from the near field transducer.

18. The method of claim 17, wherein transferring the energy from the electromagnetic radiation to the near field transducer comprises creating a resonant electric field in the dielectric resonator that locally excites the near field transducer.

* * * * *